(12) United States Patent
Bard et al.

(10) Patent No.: US 10,107,694 B2
(45) Date of Patent: Oct. 23, 2018

(54) SENSOR ARRANGEMENT, SENSOR ARRANGEMENT SYSTEM AND SET OF SENSOR ARRANGEMENT ELEMENTS

(71) Applicant: EPCOS AG, Munich (DE)

(72) Inventors: Oliver Bard, Falkensee (DE); Wolfgang Grundmann, Birkenwerder (DE)

(73) Assignee: EPCOS AG, Munich (DE)

( * ) Notice: Subject to any disclaimer, the term of this patent is extended or adjusted under 35 U.S.C. 154(b) by 197 days.

(21) Appl. No.: 15/102,290

(22) PCT Filed: Oct. 9, 2014

(86) PCT No.: PCT/EP2014/071669
§ 371 (c)(1),
(2) Date: Jun. 7, 2016

(87) PCT Pub. No.: WO2015/096910
PCT Pub. Date: Jul. 2, 2015

(65) Prior Publication Data
US 2016/0320243 A1 Nov. 3, 2016

(30) Foreign Application Priority Data
Dec. 23, 2013 (DE) .................. 10 2013 021 798

(51) Int. Cl.
*G01K 1/14* (2006.01)
*G01D 11/24* (2006.01)

(52) U.S. Cl.
CPC ............ *G01K 1/14* (2013.01); *G01D 11/245* (2013.01)

(58) Field of Classification Search
None
See application file for complete search history.

(56) References Cited

U.S. PATENT DOCUMENTS

| | | | |
|---|---|---|---|
| 4,217,492 A | 8/1980 | Fayfield | |
| 9,028,143 B2 * | 5/2015 | Bard | G01D 11/245 374/208 |
| 2002/0102884 A1 | 8/2002 | Pechstein et al. | |
| 2003/0071205 A1 | 4/2003 | Wu et al. | |
| 2003/0077948 A1 | 4/2003 | Rehmann et al. | |
| 2003/0143887 A1 | 7/2003 | Rehmann et al. | |
| 2004/0261552 A1 | 12/2004 | Grundmann et al. | |
| 2007/0183315 A1 | 8/2007 | Feucht et al. | |
| 2007/0277604 A1 | 12/2007 | Cudini et al. | |
| 2009/0095074 A1 | 4/2009 | Vinshtok et al. | |

(Continued)

FOREIGN PATENT DOCUMENTS

| | | |
|---|---|---|
| DE | 2308294 A1 | 8/1974 |
| DE | 2719841 A1 | 12/1977 |

(Continued)

*Primary Examiner* — Andre Allen
(74) *Attorney, Agent, or Firm* — Slater Matsil, LLP

(57) ABSTRACT

A sensor arrangement and a set of sensor arrangement elements are disclosed. In an embodiment the sensor arrangement includes a connector piece having a first connection part; and a sensor element having a second connection part, which is connectable to the first connection part or is connected to the first connection part, wherein the sensor arrangement, in case the connector piece and the sensor element are connected to one another, includes a plug-connection part.

16 Claims, 2 Drawing Sheets

(56) References Cited

U.S. PATENT DOCUMENTS

2012/0000291 A1   1/2012  Christoph et al.
2012/0051393 A1   3/2012  Bard et al.
2013/0336359 A1*  12/2013 Zink ...................... G01K 7/023
                                                        374/152

FOREIGN PATENT DOCUMENTS

| DE | 2928667 A1 | 2/1980 |
|---|---|---|
| DE | 20020805 U1 | 3/2001 |
| DE | 19963912 C1 | 6/2001 |
| DE | 10141200 A1 | 3/2002 |
| DE | 10055090 A1 | 5/2002 |
| DE | 10108199 A1 | 8/2002 |
| DE | 10110343 A1 | 9/2002 |
| DE | 10361461 A1 | 11/2005 |
| DE | 102006005633 A1 | 8/2007 |
| DE | 102006030849 B4 | 3/2009 |
| DE | 102008042722 A1 | 5/2009 |
| DE | 202009008971 U1 | 8/2009 |
| DE | 102008011676 A1 | 9/2009 |
| DE | 10159869 B4 | 11/2009 |
| DE | 102009017230 B3 | 8/2010 |
| DE | 102008048318 A1 | 9/2010 |
| DE | 202010011349 U1 | 12/2010 |
| DE | 102007036626 B4 | 3/2012 |
| DE | 102012006378 A1 | 12/2013 |
| EP | 0772959 B1 | 3/1998 |
| JP | 2008249378 A | 10/2008 |
| JP | 2012523553 A | 10/2012 |

* cited by examiner

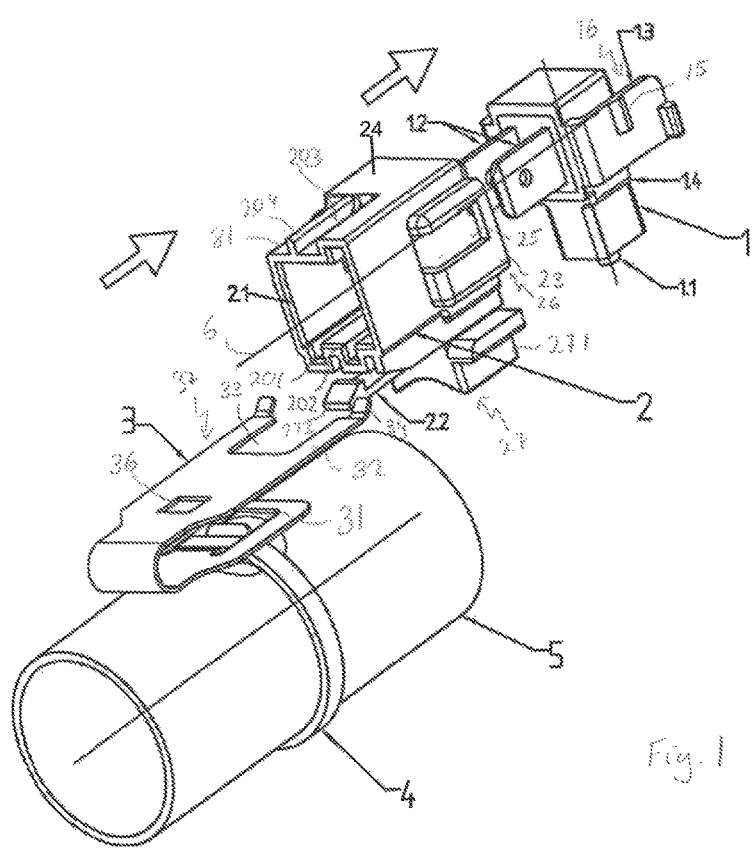
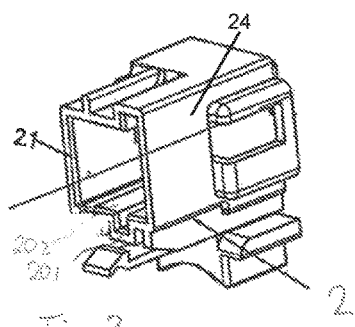
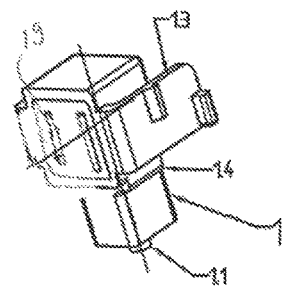

SENSOR ARRANGEMENT, SENSOR ARRANGEMENT SYSTEM AND SET OF SENSOR ARRANGEMENT ELEMENTS

This patent application is a national phase filing under section 371 of PCT/EP2014/071669, filed Oct. 9, 2014, which claims the priority of German patent application 10 2013 021798.9, filed Dec. 23, 2013, each of which is incorporated herein by reference in its entirety.

TECHNICAL FIELD

The invention relates to a sensor arrangement, a sensor arrangement system, and a set of a plurality of sensor arrangement elements.

BACKGROUND

A sensor has a probe which is configured for measuring one or a plurality of physical variables. An exemplary probe is a temperature sensor.

Temperature sensors may be employed for measuring the temperature in a system, for example, a heating plant, a heat pump or similar. When the temperatures in such a system are detected at a plurality of measuring points, the electrical connectors of the sensors at the respective measuring points should be protected against being interchanged such that any assignment of an electrical connector to the sensor at the assigned measuring point is ensured and maintained.

The sensors have plug-connection parts by means of which the former may be connected to the mating plug-connection parts of electrical connectors of lines or arrangements for processing the sensor signals.

In order to prevent interchanging, the sensors should not be mutually substitutable. This may be achieved in that the sensors in the plug-connection region thereof are coded, for example, in that they are identified by colors. The mating plug-connection parts to which said sensors are connected are also coded in a corresponding manner such that interchanging is avoided.

In the case of mechanical coding the mutually matching plug-connection parts of the sensor and of the electrical connector are connectable in a form-fitting manner, but plugging-in to the plug-connection part of another connector is not possible.

Correspondingly many variants of sensor have to be provided for maintenance, wherein manufacturing of said sensors is of course also associated with increased complexity due to the dissimilar variants.

SUMMARY OF THE INVENTION

In various embodiments, the sensor arrangement comprises a connector piece and a sensor element which are two separate parts which are connectable to one another or are connected to one another. As opposed to the conventional sensors, the sensor arrangement of the sensor element and the connector piece connected to one another has at least two parts. The parts may be manufactured independently of one another. The sensor element is connected to the connector piece only immediately prior to completion.

In various further embodiments the sensor arrangement is provided having a connector piece having a first connection part, and a sensor element having a second connection part, which is connectable to the first connection part or is connected to the first connection part. The sensor arrangement in the case of the connector piece and the sensor element being connected to one another comprises a plug-connection part.

Prior to delivery, the sensor element and the connector piece may be connected to one another by means of the first and second connection parts such that various completely assembled sensor arrangements having various plug-connection parts are on hand for measuring temperature in a system, for example. On account of various variants of plug-connection parts being employed, interchanging may be prevented. Alternatively, connecting the sensor element and the connector piece may also be performed immediately prior to the sensor arrangement being fastened to the measuring point.

One advantage arises during manufacturing, since the same sensor elements may be manufactured for a multiplicity of various connector pieces and only dissimilar connector pieces for the same sensor elements need to be manufactured, simplifying the manufacturing process.

The sensor arrangement may be delivered as a connector piece and a sensor element which have already been connected to one another such that every combination of a connector piece and a sensor element has a dissimilar socket, in which case interchanging of the plugs is not possible.

Besides the protection against interchanging of the sensor connectors, in the case of maintenance only the sensor element is now required as a spare part. The housing having the plug coding remains at the measuring point and is ready for receiving the sensor part of identical design.

Connecting may be performed by means of a snap-fit. The connection parts during connecting may be mutually aligned in a suitable manner by way of a form-fit and may be connectable to one another in a force-fitting manner by a spring force.

Advantageously, said connection parts have a latching feature such that the parts may not be separated from one another at all or only with great difficulty. Further means for additionally protecting the connection against being unintentionally released may be provided.

The plug-connection part allows separating and connecting the sensor arrangement to a corresponding mating plug-connection portion, so as to supply the sensor arrangement and to read the detected measured values.

In the case of electrical plug connections, one differentiates between the male part of a plug connection (having contact pins pointing outward) and the female part (having contact openings pointing inward). The male part is referred to as the plug. The female part is referred to as the socket or coupling. The plug-connection part sensor arrangement may be configured as a plug or a socket. There are also plug-connection parts having plug elements of either gender.

The plug-connection part may have a tubular collar which forms an external periphery of the plug-connection part around the connector contacts and may serve for guiding the mating plug-connection part. In particular in the case of connecting taking place, the collar of one plug-connection part may surround the collar of the other; besides connecting the contacts, this enables a further mechanical connection between the plug-connection parts.

In one advantageous design embodiment, both the connector piece as well as the sensor element have regions of the plug-connection part. The plug-connection part is only formed by connecting the sensor element and the connector piece. Alternatively, the plug-connection part may be provided either on the sensor element or advantageously on the connector piece.

In one design embodiment the sensor element has connector contacts which in the case of the connector piece and the sensor element being connected to one another are comprised by the plug-connection part. These connector contacts in one exemplary embodiment may form the pin-shaped or rail-shaped contact elements of the plug-connection part, or in an alternative exemplary embodiment may form the contact openings of a socket.

In one exemplary embodiment, the connector piece has a clearance having an opening in which the sensor element is positioned such that in the case of the connector piece and the sensor element being connected to one another the base of the plug-connection part is a region of the sensor element. The wall of the clearance may form a collar of the plug-connection part in the case of the connector piece and the sensor element being connected to one another. In the case of connector contacts which protrude from the housing of the sensor element, the sensor arrangement has a plug in the case of the connector piece and the sensor element being connected to one another. In the case of contact openings which are disposed in the housing, the sensor arrangement may have a socket in the case of the connector piece and the sensor element being connected to one another.

The connector piece advantageously has a coding means. This here may be a color marking and/or mechanical coding means by way of which it is to be prevented that the sensor arrangement having the connector piece is placed on connector points which are not provided therefor.

For example, the coding means may be grooves and studs beyond the connector contacts, which prevent plugging into other mating plug-connection parts having matching contacts but no matching coding.

Mechanical coding means may be one or a plurality of depressions and/or elevations in that region of the connector piece that in the case of the connector piece and the sensor element being connected to one another is comprised by the plug-connection part. The depressions and elevations may be trench-shaped, pin-shaped, and/or be formed as an edge or a step, for example. Said depressions and elevations may be structures on the collar wall of the plug-connection part and/or continuous clearances therein, for example, holes. The structures may be provided on the internal and/or external side on the collar of the plug-connection part. Positioning on the base of the plug-connection part is also possible. In order for a connection to be enabled between the plug-connection part and the mating plug-connection part corresponding thereto, depressions and elevations of this type have to engage in respective depressions and elevations on the corresponding mating plug-connection part.

Advantageously, the first connection part has a recess which receives a counter piece of the second connection part and latches to the latter, or the second connection part has a recess which receives a counter piece of the first connection part and latches to the latter. A recess is a region in or on the housing that is configured for receiving a counter piece.

The latching feature is a device in which the two connection parts when connected remain in their specific position. In one design embodiment the latching means may have a protrusion or a depression on a resilient region of the connection part, said protrusion on account of the spring force being fixed in a depression of the other connection part. The latching means is advantageously formed in such a manner that a reversing movement out of the latching position is impeded.

In one design embodiment a sensor arrangement system, which besides a sensor arrangement which furthermore has a third connection part also comprises a fastening element having a fourth connection part which is connectable or is connected to the third connection part, is provided.

The fastening element allows the connector point to be positioned at the desired measuring point. Such a fastening element may be fastened to the pipes of a heating plant, for example. The connector piece having the sensor element is then plug-fitted such that a connection is established between the third and the fourth connection part. Advantageously, the third and/or fourth connection parts have latching means. Advantageously, the fastening element has a recess for feeding through a connection element. This here may be, for example, an eyelet through which a cable tie is fed, so as to fasten the fastening element to the pipe. The fourth connection part may have a resilient clamp, for example, which enables the connection between the fastening element and the connector piece to be fixed but, on account of the spring force, also allows said connection to be released. Non-releasable connections are also conceivable.

A set of sensor arrangements is furthermore provided. Said set comprises a first connector piece having a first connection part, and a second connector piece having a first connection part which differs from the first connection part of the first connector piece. Furthermore, a sensor element having a second connection part which is connectable to the first connection part is provided, such that the arrangement of the first connector piece and the sensor element connected to one another has a plug-connection part which differs from a plug-connection part which an arrangement of the second connector piece and the sensor element connected to one another has.

This set of various connector pieces allows, with the same sensor elements, various sensor arrangements of sensor elements and connector pieces which are connected to one another, which on account of their dissimilar plug-connection parts which are only connectable to respective matching counter pieces are protected against interchanging, to be provided.

BRIEF DESCRIPTION OF THE DRAWINGS

The invention will be visualized hereunder by means of the drawings in which:

FIG. 1 shows an exploded illustration of a sensor arrangement having a sensor element and a connector piece as well as a fastening element which is fastened to a pipe piece;

FIG. 2 shows a further exemplary embodiment of a sensor element;

FIG. 3 shows a further exemplary embodiment of a connector piece;

DETAILED DESCRIPTION OF ILLUSTRATIVE EMBODIMENTS

Figure 4:
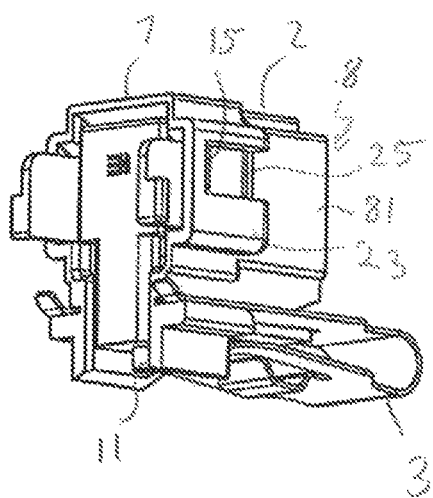
FIG. 4 shows the assembled sensor arrangement including the fastening element from FIG. 1.

The exemplary embodiment of a sensor arrangement illustrated in FIG. 1 comprises a sensor element 1, a connector piece 2, as well as a fastening element 3 which is fastened to a pipe piece 5.

The sensor element 1 comprises a housing 14 and a probe 11 which in terms of quality or preferably quantity can detect physical or chemical properties or the material consistence of its surroundings. The probe 11 in this exemplary embodiment is a temperature probe. The probe 11 may be disposed at least partially within or outside the housing 14. The detected physical or chemical properties are converted to an electric signal which is available at the output side of the sensor element 1 and may be processed.

Furthermore, the sensor element 1 comprises connector contacts 12 by means of which the electric signal is provided. In the exemplary embodiment shown, the connector contacts 12 are tongue-shaped metal rails which protrude from the housing 14 of the sensor element 1. Alternative design embodiments of connector contacts pointing outward, for example, pin-shaped connector contacts, are conceivable. The sensor element 1 on two mutually opposite housing sides furthermore comprises rail-shaped resilient regions 13 having latching means 15 on the external sides thereof. In an exemplary manner, the latching means 15 are triangular elevations on the rails 13.

The combination of rails 13 and latching means 15 forms a connection part 16 of the sensor element 1.

The connector piece 2 comprises a housing 24 having a front side and a rear side, said housing 24 having a continuous recess 21 between the front side and the rear side. The internal side of the recess 21 in the region of the front side has trench-shaped depressions 201 and elevations 202 which run parallel with the longitudinal axis 6 of the connector piece 2. Depressions 203 and elevations 204 which run parallel with the longitudinal axis 6 of the connector piece 2 are likewise provided on the external sides of the housing. The elevations and depressions 201, 202, 203, 304 are coding means.

The housing 24 furthermore has bulges 23 of the side walls that point outward and are adjacent to the rear side having clearances 25.

The combination of the recess 21 and bulges 23 forms a connection part 26 of the connector piece 2. The connection part 26 of the connector piece 2, hereunder referred to as the first connection part, is connectable to the connection part 16 of the sensor element 1, hereunder referred to as the second connection part.

The connector piece 2 comprises a third connection part 27 which is configured as an elevation 271 on the lower side of the housing and comprises a resilient tongue 22 which extends on the front side from the elevation 271 and which on the tip thereof has a latching means 273.

The sensor element 1 is connectable to the connector piece 2 by means of the first and second connection parts 16, 26 in that the sensor element 1, leading with the connector contacts 12, on the rear side is pushed into the clearance 21 of the connector piece 2 until the connection parts 16, 26 latch to one another. Here, the resilient rails 15 are guided along the bulges 23 until the latching means 15 is positioned in the clearance 25, on account of which the connection is fixed.

The bulges 23 of the connector piece 2 are formed in such a manner that the former receive the rails 13 of the sensor element 1, which serve as a counter piece, in an exact fit. When connecting the rails 13 are guided along the bulges 23 until the latching means 15 reaches the position thereof in the clearance 25 in the bulge 23, and the sensor element 1 and the connector piece 2 latch to one another.

The exemplary embodiment in an exemplary manner illustrates a first and second connection part 16, 26. It should be noted that further design embodiments which may be positioned inside one another in a form-fitting manner and latched to one another are conceivable. One of the connection parts 16, 26 may have recesses engages in a counter piece of the other connection part 16, 26 in a form-fitting manner during connecting.

In the case of the connector piece 2 and the sensor element 1 being connected to one another, the sensor arrangement has a plug-connection part 8 which is part of a plug connection by means of which the sensor arrangement may be contacted.

In the case of the connector piece 2 and the sensor element 1 being connected to one another, the housing 24 of the connector piece 2, the connector contacts 12, and the housing region of the sensor element 1 from which said connector contacts 12 protrude form a plug which is connectable to a socket or a coupling (not illustrated), respectively.

In the case of the connector piece 2 and the sensor element 1 being connected to one another, the connector elements 12 of the sensor element 2 are accessible by way of the front side of the clearance 21. The walls of the clearance 21 form a collar 81, and the housing region of the sensor element 1, from which the connector contacts 12 protrude, form a base of the plug 8.

The plug 8 has coding means 201, 202, 203, 204. In this exemplary embodiment the contour of the plug 8 by depressions and elevations of the housing wall in the connector piece 2 that surrounds the clearance 21 is formed in such a manner that the plug 8 is connectable only to a correspondingly adapted socket or coupling, respectively. The shape thereof and the position and the shape of the contact openings thereof must be able to engage in the collar 81 and in the connector contacts 12, so as to establish contact with the sensor element 1.

In this exemplary embodiment trench-shaped depressions and elevations 201, 202, 203, 204 are provided as coding means along the longitudinal axis 6. Alternatively or additionally, pin-shaped or helical depressions may also be provided. In another exemplary embodiment the plug 8 is formed in such a manner that it is part of a bayonet closure.

Alternatively or additionally, coding may be performed by colored markings on the connector piece 2 or by a colored housing 24.

The assembled sensor arrangement is fastened to the measuring point, in this exemplary embodiment a pipe portion 5, by means of a fastening element 3.

The fastening element 3 is a U-shaped, bent and resilient element which may be made from plastics or a metallic plate, for example. The fastening element 3 is connected to the measuring point. Connecting may be followed by adhesive bonding or screwing, for example, In this exemplary embodiment the fastening element 3 on the lower side thereof has an eyelet 31 through which a further fastening element 4, for example, a cable tie or a clip, may be guided so as to fasten the fastening element 3 to a pipe.

Furthermore, the fastening element 3 on the upper side thereof has a fourth connection part 37 which has a resilient clamp having tongues 32 on either side of a recess 33. The tongues 32 on the tips thereof have latching means 34. A clearance 36 is furthermore provided.

The third and fourth connection parts 27, 37 may be connected by way of a snap-fit, for example, so as thus to fix the sensor arrangement to the measuring point.

When the connector piece 2 is pushed onto the fastening element 3, the elevation 271 is positioned in the recess 33, and the tongues 32 latch to the sensor arrangement. For this purpose, the latching means 34 may engage in clearances of the housing 24 or engage behind an edge on the lower side of the housing. Furthermore, the tongue 22 of the connector piece 2 latches to the clearance 36 in the fastening means 3 such that secure fixing of the sensor arrangement to the measuring point is achieved.

FIG. 2 shows a further exemplary embodiment of a sensor element 1 which differs from the sensor element illustrated in FIG. 1 in that instead of the connector contacts 12 which protrude from the housing, contact openings 19 are provided as connector contacts. By connecting such a sensor element 1 to a connector piece 2 such as the one shown in FIG. 1, the assembled sensor arrangement has a socket with which contact may be established by means of a plug (not illustrated) having connector pins.

FIG. 3 shows a further exemplary embodiment of a connector piece which differs from the connector piece shown in FIG. 1 in terms of the coding means thereof. As opposed to the connector piece from FIG. 1, having two trenches 201 on the lower internal housing wall, this exemplary embodiment has only one trench 201 in the lower internal housing wall, such that a mating plug-connection part having two elevations and matching the exemplary embodiment shown in FIG. 1 would not fit into this recess 21 and into the respective plug.

FIG. 4 shows the assembled sensor arrangement which is tightened on the fastening means 3, in an oblique view from behind. The sensor arrangement is connected to the fastening means 3 in such a manner that the probe 11 protruding from the housing 14 is positioned in the immediate proximity of the measuring point.

Various connector pieces 2 which in terms of the coding means thereof, that is, to say in terms of the arrangement of the elevations, clearances, and depressions, differ from one another are provided in a set of sensor arrangement elements. Each of the connector pieces 2 is connectable to a sensor element 1 such that various sensor arrangements may be assembled from identical sensor elements 1 and various connector pieces 2. Since the sensor arrangement differ in terms of the coding means, the plug-connection parts thereof also differ such that interchanging of the electrical connectors is prevented, since the plug-connection parts may only be connected to matching mating plug-connection parts. The set may also have various sensor elements, such as illustrated in FIGS. 1 and 2, for example. This increases the combination potential, since sensor arrangements having a socket or a plug may be assembled.

The features of the exemplary embodiments are capable of being combined with one another.

The invention claimed is:

1. A sensor arrangement comprising:
    a connector piece comprising a first connection part, a housing having an opening, and a clearance that is continuous through the housing; and
    a sensor element comprising a second connection part that is at least one of connectable to the first connection part or connected to the first connection part, wherein the first connection part and the second connection part, when connected to one another, connect the connector piece and the sensor element to one another, wherein the connector piece and the sensor element form a plug-connection part when the connector piece and the sensor element are connected to one another, wherein the sensor element is positioned within the opening of the housing of the connector piece when the connector piece and the sensor element are connected to one another, and wherein a base of the plug-connection part is a region of the sensor element when the connector piece and the sensor element are connected to one another.

2. The sensor arrangement according to claim 1, wherein both the connector piece and the sensor element comprise regions of the plug-connection part.

3. The sensor arrangement according to claim 1, wherein the plug-connection part is configured as a plug or a socket.

4. The sensor arrangement according to claim 1, wherein the sensor element comprises connector contacts, wherein the plug-connection part includes the connector contacts when the connector piece and the sensor element are connected to one another.

5. The sensor arrangement according to claim 1, wherein the housing of the connector piece forms a side wall of the clearance and, when the connector piece and the sensor element are connected to one another, a collar of the plug-connection part is a region of the side wall.

6. The sensor arrangement according to claim 1, wherein the connector piece comprises a coding element.

7. The sensor arrangement according to claim 6, wherein the coding element comprises at least one of a depression, an elevation, or a clearance in the connector piece.

8. The sensor arrangement according to claim 7, wherein at least one of the depression or the elevation are disposed on at least one of an internal or external side of a collar of the plug-connection part, or the clearance is a continuous clearance in the collar.

9. The sensor arrangement according to claim 1, wherein, when the connector piece and the sensor element are connected to one another, the first and second connection parts mutually engage in a form-fitting manner and are fixed in a force-fitting manner by a spring force.

10. The sensor arrangement according to claim 1, wherein the first connection part comprises a recess which receives a counterpiece of the second connection part and latches to the second connection part, or wherein the second connection part comprises a recess which receives a counterpiece of the first connection part and latches to the first connection part.

11. The sensor arrangement according to claim 1, wherein the sensor element is configured for measuring temperature.

12. A sensor arrangement system comprising a sensor arrangement according to claim 1, and further comprising a third connection part and a fastening element having a fourth connection part which is connectable or is connected to the third connection part.

13. The sensor arrangement system according to claim 12, wherein at least one of the third connection part or the fourth connection part has resilient regions and a latching mechanism.

14. A set of sensor arrangement elements comprising:
    a first connector piece comprising a first connection part and first coding features;
    a second connector piece comprising a connection part and further comprising second coding features which differ from the first coding features of the first connector piece; and
    a sensor element comprising a second connection part which is connectable to the first connection part of the first connector piece to connect the first connector piece and the sensor element to one another and form a first sensor arrangement having a first plug-connection part, wherein the second connection part is connectable to the third connection part of the second connector piece to connect the second connector piece and the sensor element to one another separately and form a second sensor arrangement having a second plug-connection part which differs from the first plug-connection part.

15. A sensor arrangement comprising:
    a connector piece comprising a first connection part, a housing having a through recess, which has an opening; and
    a sensor element comprising a second connection part which is at least one of connectable to the first connection part or connected to the first connection part, wherein the sensor arrangement comprises, when the connector piece and the sensor element are connected to one another, a plug-connection part, and the sensor element is positioned in the opening such that a base of the plug-connection part is a region of the sensor element.

16. A sensor arrangement comprising:
a connector piece comprising a first connection part; and
a sensor element comprising a second connection part that is at least one of connectable to the first connection part or connected to the first connection part, wherein the first connection part and the second connection part, when connected to one another, connect the connector piece and the sensor element to one another, wherein the connector piece and the sensor element form a plug-connection part when the connector piece and the sensor element are connected to one another;
wherein at least one of the first connection part or the second connection part comprises a recess that receives a counterpiece of, and latches to, an other one of the first connection part or the second connection part.

* * * * *

UNITED STATES PATENT AND TRADEMARK OFFICE
CERTIFICATE OF CORRECTION

PATENT NO. : 10,107,694 B2
APPLICATION NO. : 15/102290
DATED : October 23, 2018
INVENTOR(S) : Bard et al.

It is certified that error appears in the above-identified patent and that said Letters Patent is hereby corrected as shown below:

In the Claims

In Column 8, Line 47, Claim 14, delete "comprising a connection part" and insert --comprising a third connection part--.

Signed and Sealed this
Eleventh Day of December, 2018

Andrei Iancu
*Director of the United States Patent and Trademark Office*